Dec. 21, 1965  L. F. PALMER, SR  3,224,222
UNIVERSAL JOINT
Filed Jan. 9, 1963
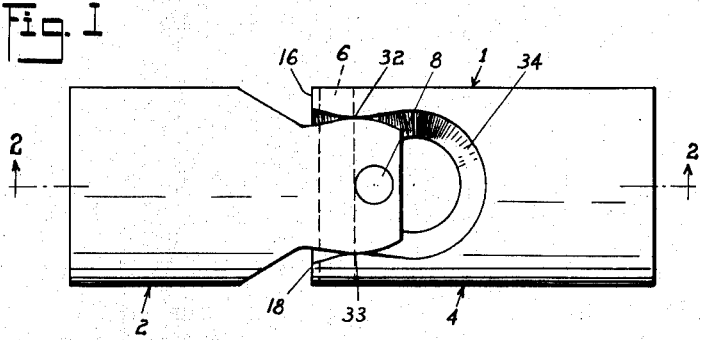
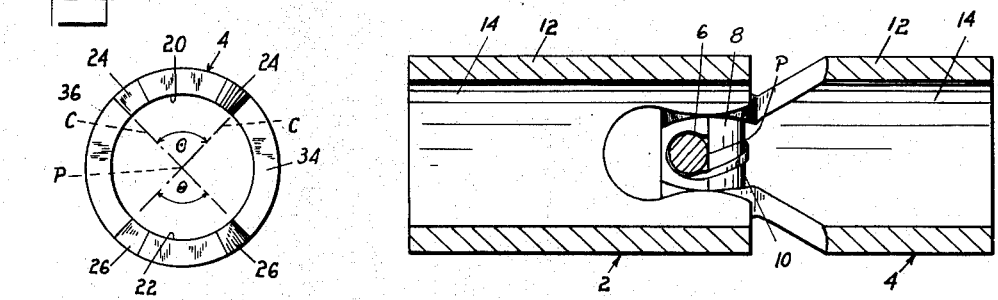
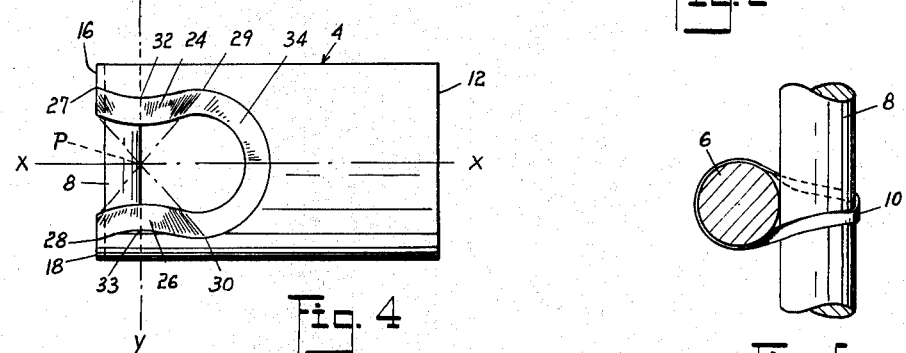
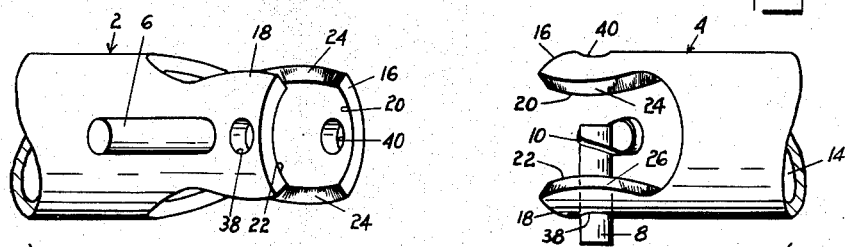
INVENTOR.
BY Lawrence F. Palmer, Sr.
Teare, Tetzer & Teare
ATTORNEYS 3,224,222
UNIVERSAL JOINT
Lawrence F. Palmer, Sr., 179 E. 317th St.,
Willowick, Ohio
Filed Jan. 9, 1963, Ser. No. 250,389
5 Claims. (Cl. 64—9)

This invention relates to universal joints, and more particularly to a joint which is useful in transmitting torque in connection with power transmission shafts or the like.

Heretofore, in prior art devices, it was necessary to make universal joints of expensive, multi-part ball and socket constructions or to make the joint of a cross-pivot axes construction in order to withstand the transmission of torque forces during normal useage thereof. In operation of joints having cross-pivot axes construction, resultant torque forces are transmitted to the pivot pins within the required operating limits. Such construction imposes stresses upon the pins which are severe and cyclical in nature, causing the pins to prematurely crack or break in normal use, thus adding to the cost and limiting the useability of such devices.

Accordingly, an object of the present invention is to provide a universal joint which is of a simple construction, economical to produce and which is more durable in use than previous joints of a similar character.

Another object of the present invention is to provide a universal joint comprising a pair of yoke members interconnected by cross-pintles, such that the respective yoke members may be freely articulated about a common pivot center to provide a smooth homokinetic action in operation.

A further object of the present invention is to provide a means for operably retaining the cross-pintles in the assembled condition of the joint, which is economical to produce and which is effective for limiting axial movement of the respective yoke members, but which will not interfere with the smooth homokinetic action of the joint.

A still further object of the present invention is to provide the respective yoke members comprising the joint with coacting torque load bearing surfaces for effectively transmitting the torque therebetween, thus providing a joint of maximum ruggedeness by eliminating the stress on the pintles themselves.

The foregoing and other objects and advantages of the present invention will become apparent from a consideration of the following description and accompanying drawings, wherein:

FIG. 1 is a side elevational view of the universal joint of the present invention;

FIG. 2 is a longitudinal sectional view taken generally along the plane of line 2—2 of FIG. 1;

FIG. 3 is an end view of one of the yoke members comprising the universal joint of the present invention;

FIG. 4 is a side elevational view of the yoke member shown in FIG. 3;

FIG. 5 is an enlarged fragmentary detailed view showing the embracing engagement of the endless connecting link relative to a pair of cross-pintles for connecting the respective yoke members together, and;

FIG. 6 is an exploded assembly view showing the components of the universal joint of the present invention.

Generally, the universal joint of the present invention, designated generally at 1, comprises a pair of yoke members 2 and 4 interconnected for relative angular movement relative to one another about a common pivot center. The interconnection between the respective yoke members 2 and 4 comprises a pair of cross-pintles 6 and 8 for operatively connecting the yoke members 2 and 4, together with an endless connecting link 10 embracing the cross-pintles 6 and 8 for interlocking the yoke members against relative axial movement and for maintaining the members of the joint in freely articulated condition during normal useage thereof.

Referring now more particularly to FIGS. 1 to 6 of the drawings, the yoke members 2 and 4 which comprise the joint 1 are preferably of identical construction. Thus, for purposes of disclosure, the following description will proceed with reference to one of the yoke members 4, wherein like reference characters refer to like parts and surfaces throughout.

The yoke member 4 preferably has a generally cylindrical body portion 12 (FIGS. 4 and 6) with a shank receiving bore 14 extending therethrough for connection by any conventional means (not shown) to an associated driven or driving part. The generally cylindrical body portion 12 may be machined out on both sides, adjacent one end thereof, such as by suitable form cutters, to provide a pair of diametrically opposed, axially extending, arcuate-like tongues 16 and 18.

In the form illustrated, the tongues 16 and 18 are provided adjacent the end remote from the cylindrical body portion 12 with oppositely disposed, generally conical sections 20 and 22 which define along opposing marginal edges thereof, generally conical, torque load bearing surfaces 24 and 26 commencing (in elevation) at the points 27, 28 and terminating at the points 29, 30, as best shown in FIGS. 3 and 4. It is preferred that the vertex angle theta ($\theta$) defined by the cone elements C of the respective conical sections 20 and 22 to be about 90°, such that the vertices of the respective conical sections are coincident at the pivot center P of the joint. The pivot center P of the joint is defined as the inter section of the plane Y, containing the common vertical axis through the conical sections 20 and 22 of the respective yoke members 2 and 4, with the geometrical axis X through the yoke members 2 and 4, when assembled. Accordingly, the high points 32, 33 on the conical load bearing surfaces 24 and 26 of one of the yoke members 2 are substantially tangent or are in surface to surface contact with the corresponding high points 32, 33 on the complementary conical load bearing surfaces 24 and 26 of the other yoke member 4, and lie in the plane Y passing passing through the pivot center P, as best shown in FIGS. 1 and 4. Moreover, by such an arrangement, the respective yoke members 2 and 4 may be moved in any angular relation relative to one another about the common pivot center P with the resultant torque forces effectively transmitted to the conical load bearing surfaces 24 and 26, as will hereinafter be more fully described.

The tongues 16 and 18 are provided adjacent the cylindrical body portion 12, with generally semi-circular socket sections 34 and 36 commencing (in elevation) at the point 29 and terminating at the point 30 on both sides of the respective yoke member 4, thereby defining clearance areas therewith which provide a uniform angular coaction as the tongues 16 and 18 of one yoke member 2 pivot into the open areas between the tongues 16 and 18 of the other yoke 4 during movement of one relative to the other. The tongues 16 and 18 are provided with oppositely disposed generally vertically extending pintle receiving bores 38 and 40 which may be formed advantageously by suitable drilling operations. It is preferred that the bores 38 and 40 be off-set relative to the pivot center P of the joint, such that they are tangent throughout their length to the plane Y containing the common vertical axis through the conical sections 20 and 22 of the respective yoke members 2 and 4. By such an arrangement, when the cross-pintles 6 and 8 are inserted into the bores 38 and 40 for connecting the respective yoke members together, the pintles 6 and 8 will be crossed generally normally relative to one another, such that their point of tangency is substantially coincident with the vertices of the respective conical sections 20 and 22 and the pivot center P of the joint. Accordingly, by such an arrangement, the yoke members 2 and 4 may be freely articulated about the common pivot center P of the joint.

As best shown in FIGS. 5 and 6, the endless link 10 embracing the cross pintles 6 and 8 for connecting the respective yoke members 2 and 4 together, is preferably of a twisted, generally oval configuration. The link 10 may be originally of a generally circular configuration and may be advantageously produced by inserting the pintles 6 and 8 in parallel relation through the original circular configuration and then by swinging the pintles 6 and 8 through about 90° at right angles to one another to provide the twisted, generally oval configuration, as shown in the drawings. Moreover, the link 10 is made to fit snugly in embracing engagement around the cross-pintles for connecting the respective yoke members 2 and 4 together and for limiting axial movement relative thereto, thereby maintaining the vertices of the conical sections 20 and 22 of the respective yokes 2 and 4 at the pivot center P of the joint, and allowing free pivotal articulation of the yokes 2 and 4 about the pivot center. While it is important that the endless link 10 engageable coact with the cross-pintles 6 and 8, the engagement should not be such as to interfere with the smooth pivotal operation of the joint during use.

Assembly of the universal joint 1 is illustrated generally at FIG. 6. The pintle 8 may first be inserted into the bore 38 of one of the yoke members 4, through the link 10 and into the oppositely disposed bore 40. The other yoke member 2 may then be rotated about 90° relative to the first mentioned yoke member 4 and moved axially toward the first mentioned yoke member until the high points 32, 33 on the conical torque load bearing surfaces 24 and 26 of the yoke member are substantially tangent or are in surface-to-surface contact with the corresponding high points 32, 33 on the first mentioned yoke member 2. The other pintle 6 may then be inserted into the bore 38 of the yoke member 4, through the link 10 and into the oppositely disposed bore 40 to form the articulated joint 1, as shown in the drawings.

From the foregoing description and accompanying drawings, by providing the respective yoke members 2 and 4 with cross-pintles 6 and 8 operatively interconnected in such a manner as to provide relative angular movements about a common pivot center P, and by providing the tongues 16 and 18 of the respective yoke members 2 and 4 with complementary conical torque load bearing surfaces 24 and 26 which coact with one another during such angular movement, considerable additional strength is imparted to the joint. Moreover, when the joint is assembled, the surface-to-surface coaction between the tongues 16 and 18 of the respective yoke members 2 and 4 augments the total strength of the joint and relieves the shear stress on the pintles 6 and 8, which has heretofore been the case in devices of conventional construction. In addition to providing a much stronger joint construction, the universal joint of the present invention functions to provide a substantial angular movement between a driven and a driving part, for example, and which provides an unusually smooth pivotal coaction during rotation thereof.

The terms and expressions which have been used are used as terms of description and not of limitation, and there is no intention in the use of such terms and expressions of excluding any equivalents of any of the features shown, or described, or portions thereof, but it is recognized that various modifications are possible within the scope of the invention, as set forth in the appended claims.

I claim:

1. A joint comprising, a pair of yoke members, each of said yoke members including torque load bearing surfaces for coaction with torque bearing surfaces on the other of said yoke members, and means operatively connecting said yoke members together for pivotal articulation of the joint on said torque bearing surfaces, said means connecting said yoke members together including a pair of cross-pintles, and retaining means embracing said cross-pintles to maintain said yoke members in operative position during pivotal articulation of said joint, said retaining means including an endless link having a twisted, generally oval configuration.

2. A universal joint comprising, a pair of yoke members, each of said yoke members including a pair of oppositely disposed tongues adjacent one end thereof, the tongues of one of said yoke members having torque load bearing surfaces along opposed marginal edges thereof for coaction with corresponding torque load bearing surfaces on the tongues of the other of said yoke members, and means operatively connecting said yoke members together for pivotal articulation of the joint on said torque bearing surfaces, said means connecting said yoke members together including a pair of cross-pintles, and retaining means embracing said cross-pintles to maintain said yoke members in operative position during pivotal articulation of said joint, and said retaining means including an endless link having a twisted, generally oval configuration.

3. A universal joint comprising, a pair of yoke members, each of said yoke members including oppositely disposed tongues having opposed pintle receiving bores adjacent one end thereof, the tongues of one of said yoke members having torque load bearing surfaces adjacent opposing marginal edges thereof for coaction with corresponding torque load bearing surfaces on the tongues of the other of said yoke members, a pair of oppositely disposed cross-pintles located in said pintle receiving bores and being closely adjacent to one another to provide angular articulation of the joint about a common pivot center, and retaining means embracing said cross-pintles to maintain said yoke members in operative position during angular articulation of said joint, and said retaining means including an endless link having a twisted, generally oval configuration.

4. A joint for transmitting torque forces between one member and another member comprising, a pair of yoke members, each of said yoke members including a pair of oppositely disposed generally arcuate, in end elevation, tongues having oppositely disposed pintle receiving bores therein, the tongues of one of said yoke members including conical, inwardly converging torque load bearing surfaces adjacent opposed marginal edges thereof for coaction with corresponding conical, inwardly converging torque load bearing surfaces on the tongues of the other of said yoke members, a pair of oppositely disposed cross-pintles disposed in said pintle bores and connecting said yoke member together, and an endless link embracingly engaging said cross-pintles to provide angular articulation of the joint about a common pivot center, and the vertices defined by the conical surfaces of the respective of said yoke members being substantially coincident at the pivot center of said joint for angular articulation of the joint about said pivot center on said conical surfaces.

5. A joint for transmitting torque forces between one member and another member comprising, a pair of yoke members, each of said yoke members including a pair of oppositely disposed generally arcuate, in end elevation, tongues having oppositely disposed pintle receiving bores therein, the tongues of one of said yoke members including conical, inwardly converging torque load bearing surfaces adjacent opposed marginal edges thereof for coacting engagement with corresponding conical, inwardly converging torque load bearing surfaces on the tongues of the other of said yoke members, a pair of oppositely disposed cross-pintles disposed in said pintle receiving bores and connecting said yoke members together, said pintles being disposed in close adjacent relationship for engagement against one another, means holding said pintles in said close adjacent relationship for engagement against one another to provide angular articulation of the joint about a common pivot center, and the vertex angles defined by the conical surfaces of the tongues of the respective of said yoke members being approximately 90° so that the vertices thereof are coincident at the point of tangency between said pintles for angular articulation of the joint about said common pivot center on said conical surfaces.

References Cited by the Examiner

UNITED STATES PATENTS

| 733,181 | 7/1903 | Forsyth | 64—2.6 |
| 1,038,757 | 9/1912 | Jameson | 64—2.6 |
| 1,143,659 | 6/1915 | Stern | 64—17 |
| 1,397,951 | 11/1921 | Fischer | 64—9 |
| 2,394,890 | 2/1946 | Blomgren | 64—9 |

FOREIGN PATENTS

| 1,013,028 | 4/1952 | France. |

MILTON KAUFMAN, *Primary Examiner.*

ROBERT C. RIORDON, FRANK SUSKO, *Examiners.*